United States Patent
Thyagarajan et al.

(10) Patent No.: US 6,529,634 B1
(45) Date of Patent: *Mar. 4, 2003

(54) CONTRAST SENSITIVE VARIANCE BASED ADAPTIVE BLOCK SIZE DCT IMAGE COMPRESSION

(75) Inventors: Kadayam Thyagarajan, San Diego, CA (US); Michael J. Merritt, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/436,085

(22) Filed: Nov. 8, 1999

(51) Int. Cl.[7] .............................. G06K 9/36; H04N 1/415

(52) U.S. Cl. ........................ 382/239; 382/240; 358/433

(58) Field of Search ................................ 382/239, 240, 382/248, 232, 253; 358/433, 261.2, 426.14; 375/240.02, 240.11, 240.2, 240.24

(56) References Cited

U.S. PATENT DOCUMENTS

| 5,107,345 | A | | 4/1992 | Lee ............................ 382/250 |
|---|---|---|---|---|
| 5,241,395 | A | * | 8/1993 | Chen ...................... 358/426.14 |
| 5,452,104 | A | * | 9/1995 | Lee ............................ 358/433 |
| 5,455,680 | A | * | 10/1995 | Shin ............................ 382/239 |
| 5,471,248 | A | | 11/1995 | Bhargava et al. ...... 375/240.24 |
| 5,585,944 | A | | 12/1996 | Rodriguez ................. 358/500 |
| 5,724,451 | A | | 3/1998 | Shin et al. .................. 382/240 |
| 5,903,669 | A | * | 5/1999 | Hirabayashi ............... 382/232 |

FOREIGN PATENT DOCUMENTS

DE 19503571 A1 * 3/1996 ............ H04N/7/26

OTHER PUBLICATIONS

"A fully adaptive DCT based color image sequence coder", Chen, Rong–Jian et al., Signal Processing Image Communication, vol. 6, No. 4, Aug. 1, 1994, pp. 289–301.*

"Adaptive block–size transform coding for image compression," Javier Bracamonte et al., 1997 IEEE International Conference on Acoustics, Speech, and Signal Processing, 1997, ICASSP–97, vol. 4, 1997, pp. 2721–2724.*

Vaisey J. et al.; "image Compression With Variable Block Size Segmentation"; IEEE Transactions on Signal Processing, US, IEEE, Inc. NY vol. 40, No. 8, pp. 2041, 2044, 2047, and 2048; Aug. 1, 1992.

* cited by examiner

Primary Examiner—Wenpeng Chen
(74) Attorney, Agent, or Firm—Philip Wadsworth; Gregory D. Ogrod; Sandip S. Minhas

(57) ABSTRACT

A system and method for image compression utilizing adaptively sized blocks and sub-blocks of discrete cosine transform coefficient data is presented. A block size assignment element in the encoder selects the block or sub-block of an input block of pixels to be processed. The selection is based on the variance of pixel values. Blocks with variances larger than a threshold are subdivided, while blocks with variances smaller than a threshold are not subdivided. A transform element transforms the pixel values of the selected blocks into the frequency domain. The frequency domain values may then be quantized, serialized, and variable length coded in preparation for transmission.

35 Claims, 3 Drawing Sheets

PQR DATA

CONTRAST SENSITIVE VARIANCE BASED ADAPTIVE BLOCK SIZE DCT IMAGE COMPRESSION

BACKGROUND OF THE INVENTION

I. Field of the Invention

The present invention relates to image processing. More specifically, the present invention relates to a compression scheme for image signals utilizing adaptively sized blocks and sub-blocks of encoded discrete cosine transform coefficient data.

II. Description of the Related Art

In the field of transmission and reception of video signals such as are used for projecting "films" or "movies", various improvements are being made to image compression techniques. Many of the current and proposed video systems make use of digital encoding techniques. Digital encoding provides a robustness for the communications link which resists impairments such as multipath fading and jamming or signal interference, each of which could otherwise serious degrade image quality. Furthermore, digital techniques facilitate the use signal encryption techniques, which are found useful or even necessary for governmental and many newly developing commercial broadcast applications.

High definition video is an area which benefits from improved image compression techniques. When first proposed, over-the-air transmission of high definition video (or even over-wire or fiber-optical transmission) seemed impractical due to excessive bandwidth requirements. Typical wireless, or other, transmission systems being designed did not readily accommodate enough bandwidth. However, it has been realized that compression of digital video signals may be achieved to a level that enables transmission using reasonable bandwidths. Such levels of signal compression, coupled with digital transmission of the signal, will enable a video system to transmit with less power with greater immunity to channel impairments while occupying a more desirable and useful bandwidth.

One compression technique capable of offering significant levels of compression while preserving the desired level of quality for video signals utilizes adaptively sized blocks and sub-blocks of encoded Discrete Cosine Transform (DCT) coefficient data. This technique will hereinafter be referred to as the Adaptive Block Size Differential Cosine Transform (ABSDCT) method. This technique is disclosed in U.S. Pat. No. 5,021,891, entitled "Adaptive Block Size Image Compression Method And System," assigned to the assignee of the present invention and incorporated herein by reference. DCT techniques are also disclosed in U.S. Pat. No. 5,107,345, entitled "Adaptive Block Size Image Compression Method And System," assigned to the assignee of the present invention and incorporated herein by reference. Further, the use of the ABSDCT technique in combination with a Differential Quadtree Transform technique is discussed in U.S. Pat. No. 5,452,104, entitled "Adaptive Block Size Image Compression Method And System," also assigned to the assignee of the present invention and incorporated herein by reference. The systems disclosed in these patents utilizes what is referred to as "intra-frame" encoding, where each frame of image data is encoded without regard to the content of any other frame. Using the ABSDCT technique, the achievable data rate may be reduced from around 1.5 billion bits per second to approximately 50 million bits per second without discernible degradation of the image quality.

The ABSDCT technique may be used to compress either a black and white or a color image or signal representing the image. The color input signal may be in a YIQ format, with Y being the luminance, or brightness, sample, and I and Q being the chrominance, or color, samples for each 4×4 block of pixels. Other known formats such as the YUV or RGB formats may also be used. Because of the low spatial sensitivity of the eye to color, most research has shown that a sub-sample of the color components by a factor of four in the horizontal and vertical directions is reasonable. Accordingly, a video signal may be represented by four luminance components and two chrominance components.

Using ABSDCT, a video signal will generally be segmented into blocks of pixels for processing. For each block, the luminance and chrominance components are passed to a block interleaver. For example, a 16×16 (pixel) block may be presented to the block interleaver, which orders or organizes the image samples within each 16×16 block to produce blocks and composite sub-blocks of data for discrete cosine transform (DCT) analysis. The DCT operator is one method of converting a time-sampled signal to a frequency representation of the same signal. By converting to a frequency representation, the DCT techniques have been shown to allow for very high levels of compression, as quantizers can be designed to take advantage of the frequency distribution characteristics of an image. In a preferred embodiment, one 16×16 DCT is applied to a first ordering, four 8×8 DCTs are applied to a second ordering, 16 4×4 DCTs are applied to a third ordering, and 64 2×2 DCTs are applied to a fourth ordering.

The DCT operation reduces the spatial redundancy inherent in the video source. After the DCT is performed, most of the video signal energy tends to be concentrated in a few DCT coefficients. An additional transform, the Differential Quad-Tree Transform (DQT), may be used to reduce the redundancy among the DCT coefficients.

For the 16×16 block and each sub-block, the DCT coefficient values and the DQT value (if the DQT is used) are analyzed to determine the number of bits required to encode the block or sub-block. Then, the block or the combination of sub-blocks that requires the least number of bits to encode is chosen to represent the image segment. For example, two 8×8 sub-blocks, six 4×4 sub-blocks, and eight 2×2 sub-blocks may be chosen to represent the image segment.

The chosen block or combination of sub-blocks is then properly arranged in order into a 16×16 block. The DCT/DQT coefficient values may then undergo frequency weighting, quantization, and coding (such as variable length coding) in preparation for transmission.

Although the ABSDCT technique described above performs remarkably well, it is computationally intensive. Thus, compact hardware implementation of the technique may be difficult. An alternative technique that would make hardware implementation more efficient is desired. An image compression method and system that is more computationally efficient is provided by the present invention in the manner described below.

SUMMARY OF THE INVENTION

The present invention is system and method of image compression that utilizes adaptively sized blocks and sub-blocks of Discrete Cosine Transform coefficient data. In one embodiment, a 16×16 block of pixels is input to an encoder. The encoder comprises a block size assignment element, which segments the input block of pixels for processing. The block size assignment is based on the variances of the input block and subdivided blocks. In general, areas with larger variances will be subdivided into smaller blocks, whereas areas with smaller variances will not be subdivided, provided the block and sub-block mean values fall into different predetermined ranges. Thus, first the variance threshold of a block is modified from its nominal value depending on its mean value, and then the variance of the block is compared with a threshold, and if the variance is greater than the threshold, then the block is subdivided.

The block size assignment is provided to a transform element, which transforms the pixel data into frequency domain data. The transform is performed only on the block and sub-blocks selected through block size assignment. The transform data then undergoes quantization and serialization. For example, zigzag scanning may be utilized to serialize the data to produce a stream of data. The stream of data may then be coded by a variable length coder in preparation for transmission. The encoded data is sent through a transmission channel to a decoder, where the pixel data is reconstructed in preparation for display.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
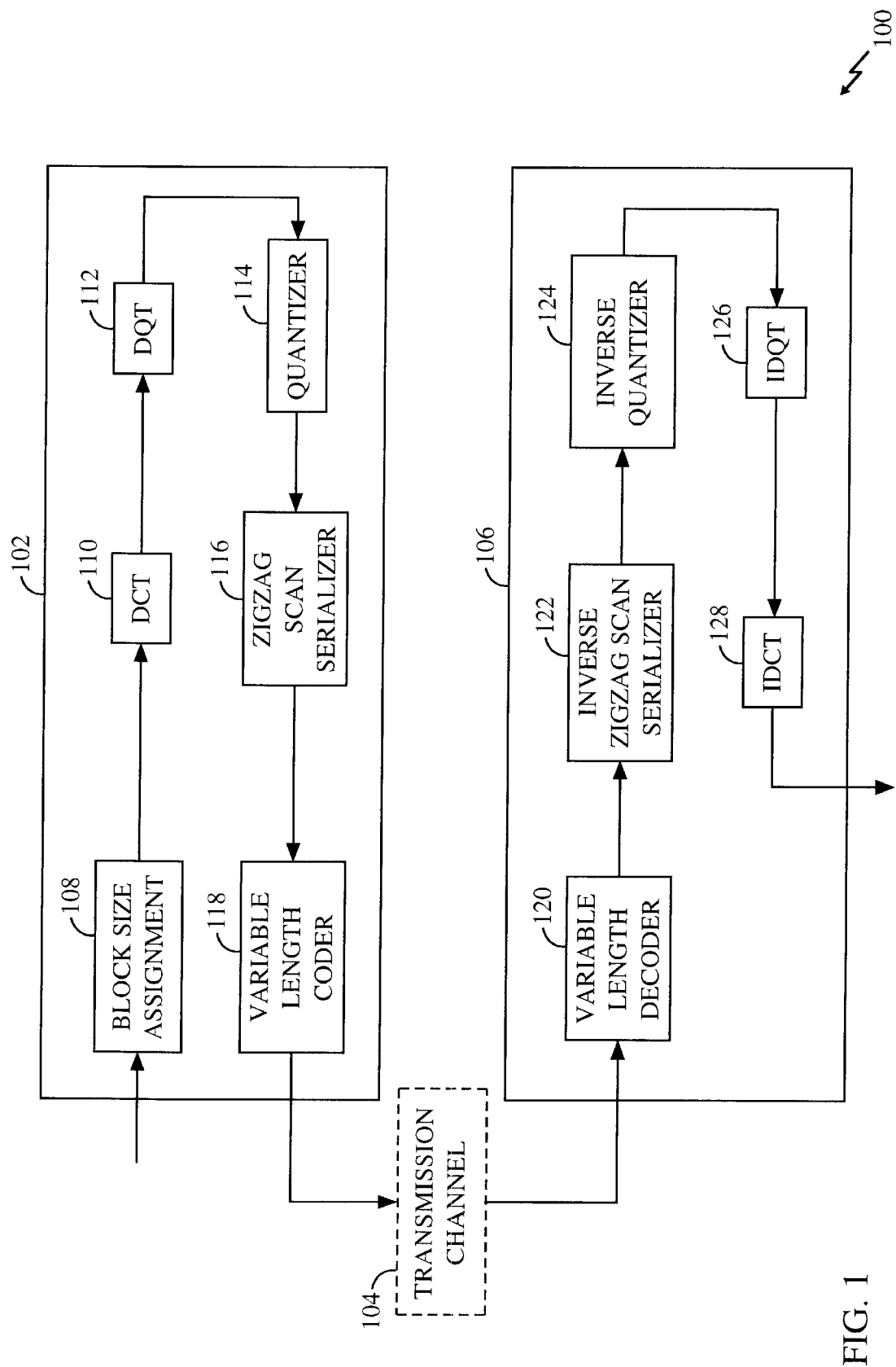
FIG. 1 is a block diagram of an image processing system that incorporates the variance based block size assignment system and method of the present invention.

In order to facilitate digital transmission of digital signals and enjoy the corresponding benefits, it is generally necessary to employ some form of signal compression. To achieve high definition in a resulting image, it is also important that the high quality of the image be maintained. Furthermore, computational efficiency is desired for compact hardware implementation, which is important in many applications.

The present invention provides a system or apparatus and method of image compression that takes into account both the image quality and computational efficiency in performing image compression. The image compression of the present invention is based on discrete cosine transform (DCT) techniques. Generally, an image to be processed in the digital domain would be composed of pixel data divided into an array of non-overlapping blocks, N×N in size. A two-dimensional DCT may be performed on each block. The two-dimensional DCT is defined by the following relationship:

$$X(k, l) = \frac{\alpha(k)\beta(l)}{N} \sum_{m=0}^{N-1}\sum_{n=0}^{N-1} x(m,n)\cos\left[\frac{(2m+1)\pi k}{2N}\right]\cos\left[\frac{(2n+1)\pi l}{2N}\right],$$

$$0 \le k, l \le N-1$$

wherein $$\alpha(k), \beta(k) = \begin{cases} 1, \text{if } k = 0 \\ \sqrt{2}, \text{if } k \ne 0 \end{cases},$$

and
  x(m,n) is the pixel location (m,n) within an N×N block, and
  X(k,l) is the corresponding DCT coefficient.

Since pixel values are non-negative, the DCT component X(0,0) is always positive and usually has the most energy. In fact, for typical images, most of the transform energy is concentrated around the component X(0,0). This energy compaction property makes the DCT technique such an attractive compression method.

The image compression technique of the present invention utilizes contrast adaptive coding to achieve further bit rate reduction. It has been observed that most natural images are made up of flat relatively slow varying areas, and busy areas such as object boundaries and high-contrast texture. Contrast adaptive coding schemes take advantage of this factor by assigning more bits to the busy areas and less bits to the less busy areas.

Contrast adaptive coding is also useful for reducing the blocking effect. In the implementation of other DCT coding techniques, the blocking effect is perhaps the most important impairment to image quality. Furthermore, the blocking effect tends to be more perceptible in busy areas of the image. However, it has been realized that the blocking effect is reduced when a smaller sized DCT is used. The blocking effect becomes virtually invisible when a 2×2 DCT is used, although the bit per pixel performance may suffer. Thus, contrast adaptive coding may reduce the blocking effect by assigning smaller block sizes (and thereby more bits) to the busy areas and larger block sizes to the relatively blank areas.

Another feature of the present invention is that it utilizes intraframe coding (spatial processing) instead of interframe coding (spatio-temporal processing). One reason for the adoption of intraframe coding is the high complexity of the receiver required to process interframe coding signals. Interframe coding inherently requires multiple frame buffers in addition to more complex processing circuits. In many applications, reduced complexity is needed for actual implementation.

A second reason for using intraframe coding is that a situation, or program material, may exist that can make a spatio-temporal coding scheme break down and perform poorly. For example, 24 frame per second movies can fall into this category since the integration time, due to the mechanical shutter, is relatively short. The short integration time allows a higher degree of temporal aliasing. The assumption of frame to frame correlation breaks down for rapid motion as it becomes jerky.

An additional reason for using intraframe coding is that a spatio-temporal coding scheme is more difficult to standardize when both 50 Hz and 60 Hz power line frequencies are involved. Television currently transmits signals at either 50 Hz or 60 Hz. The use of an intraframe scheme, being a digital approach, can adapt to both 50 Hz and 60 Hz operation, or even to 24 frame per second movies by trading off frame rate versus spatial resolution.

For image processing purposes, the DCT operation is performed on pixel data that is divided into an array of non-overlapping blocks. Note that although block sizes are discussed herein as being N×N in size, it is envisioned that various block sizes may be used. For example, a N×M block size may be utilized where both N and M are integers with M being either greater than or less than N. Another important aspect is that the block is divisible into at least one level of sub-blocks, such as N/i×N/i, N/i×N/j, N/i×M/j, and etc. where i and j are integers. Furthermore, the exemplary block size as discussed herein is a 16×16 pixel block with corresponding block and sub-blocks of DCT coefficients. It is further envisioned that various other integers such as both even or odd integer values may be used, e.g. 9×9.

Referring now to FIG. 1, an image processing system 100 which incorporates the compression system of the present invention is shown. The image processing system 100 comprises an encoder 102 that compresses a received video signal. The compressed signal is transmitted through a transmission channel 104, and received by a decoder 106. The decoder 106 decodes the received signal into image samples, which may then be displayed.

In general, an image is divided into blocks of pixels for processing. A color signal may be converted from RGB space to $YC_1C_2$ space, with Y being the luminance, or brightness, component, and $C_1$ and $C_2$ being the chrominance, or color, components. Because of the low spatial sensitivity of the eye to color, many systems subsample the $C_1$ and $C_2$ components by a factor of four in the horizontal and vertical directions. However, the sub-sampling is not necessary. A full resolution image, known as 4:4:4 format, may be either very useful or necessary in some applications such as those referred to as covering "digital cinema." Two possible $YC_1C_2$ representations are, the YIQ representation and the YUV representation, both of which are well known in the art. It is also possible to employ a variation of the YUV representation known as YCbCr.

In a preferred embodiment, each of the Y, Cb, and Cr components is processed without sub-sampling. Thus, an input of a 16×16 block of pixels is provided to the encoder 102. The encoder 102 comprises a block size assignment element 108, which performs block size assignment in preparation for video compression. The block size assignment element 108 determines the block decomposition of the 16×16 block based on the perceptual characteristics of the image in the block. Block size assignment subdivides each 16×16 block into smaller blocks in a quad-tree fashion depending on the activity within a 16×16 block. The block size assignment element 108 generates a quad-tree data, called the PQR data, whose length can be between 1 and 21 bits. Thus, if block size assignment determines that a 16×16 block is to be divided, the R bit of the PQR data is set and is followed by four additional bits of P data corresponding to the four divided 8×8 blocks. If block size assignment determines that any of the 8×8 blocks is to be subdivided, then four additional bits of Q data for each 8×8 block subdivided are added.

Figure 2:
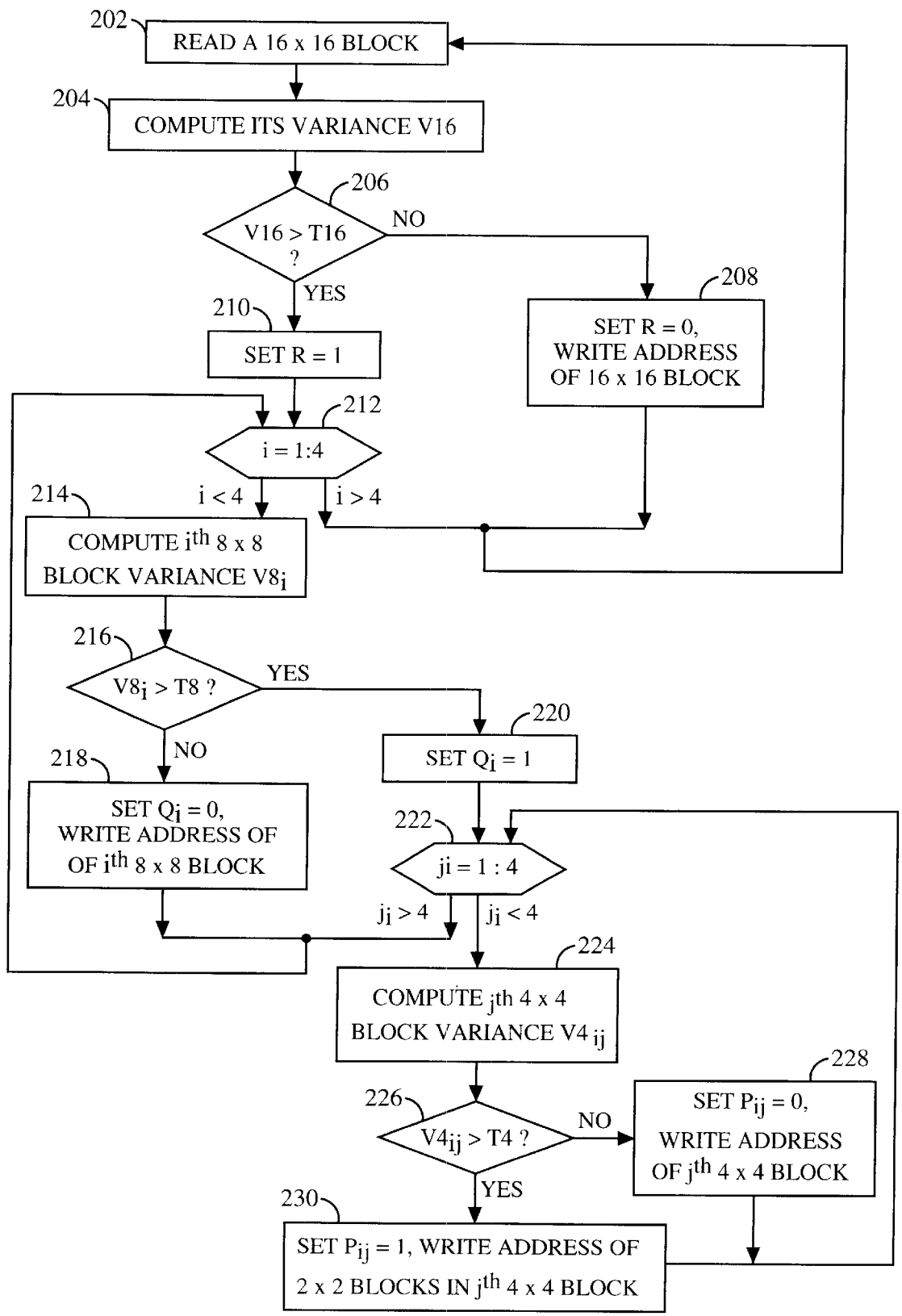
FIG. 2 is a flow diagram illustrating the processing steps involved in variance based block size assignment.

Referring now to FIG. 2, a flow diagram showing details of the operation of the block size assignment element 108 is provided. The algorithm uses the variance of a block as a metric in the decision to subdivide a block. Beginning at step 202, a 16×16 block of pixels is read. At step 204, the variance, v16, of the 16×16 block is computed. The variance is computed as follows:

$$\text{var} = \frac{1}{N^2}\sum_{i=0}^{N-1}\sum_{j=0}^{N-1} x_{i,j}^2 - \left(\frac{1}{N^2}\sum_{i=0}^{N-1}\sum_{j=0}^{N-1} x_{i,j}\right)^2$$

where N=16, and $x_{ij}$ is the pixel in the $i^{th}$ row, $j^{th}$ column within the N×N block. At step 206, first the variance threshold T16 is modified to provide a new threshold T'16 if the mean value of the block is between two predetermined values, then the block variance is compared against the new threshold, T'16.

If the variance v16 is not greater than the threshold T16, then at step 208, the starting address of the 16×16 block is written, and the R bit of the PQR data is set to 0 to indicate that the 16×16 block is not subdivided. The algorithm then reads the next 16×16 block of pixels. If the variance v16 is greater than the threshold T16, then at step 210, the R bit of the PQR data is set to 1 to indicate that the 16×16 block is to be subdivided into four 8×8 blocks.

The four 8×8 blocks, i=1:4, are considered sequentially for further subdivision, as shown in step 212. For each 8×8 block, the variance, $v8_i$, is computed, at step 214. At step 216, first the variance threshold T8 is modified to provide a new threshold T'8 if the mean value of the block is between two predetermined values, then the block variance is compared to this new threshold.

If the variance $v8_i$ is not greater than the threshold T8, then at step 218, the starting address of the 8×8 block is written, and the corresponding Q bit, $Q_i$, is set to 0. The next 8×8 block is then processed. If the variance $v8_i$ is greater than the threshold T8, then at step 220, the corresponding Q bit, $Q_i$, is set to 1 to indicate that the 8×8 block is to be subdivided into four 4×4 blocks.

The four 4×4 blocks, $j_i$=1:4, are considered sequentially for further subdivision, as shown in step 222. For each 4×4 block, the variance, $v4_{ij}$, is computed, at step 224. At step 226, first the variance threshold T4 is modified to provide a new threshold T'4 if the mean value of the block is between two predetermined values, then the block variance is compared to this new threshold.

If the variance $v4_{ij}$ is not greater than the threshold T4, then at step 228, the address of the 4×4 block is written, and the corresponding P bit, $P_{ij}$, is set to 0. The next 4×4 block is then processed. If the variance $v4_{ij}$ is greater than the threshold T4, then at step 230, the corresponding P bit, $P_{ij}$, is set to 1 to indicate that the 4×4 block is to be subdivided into four 2×2 blocks. In addition, the address of the 4 2×2 blocks are written.

The thresholds T16, T8, and T4 may be predetermined constants. This is known as the hard decision. Alternatively, an adaptive or soft decision may be implemented. The soft decision varies the thresholds for the variances depending on the mean pixel value of the 2N×2N blocks, where N can be 8, 4, or 2. Thus, functions of the mean pixel values, may be used as the thresholds.

Figure 3A:
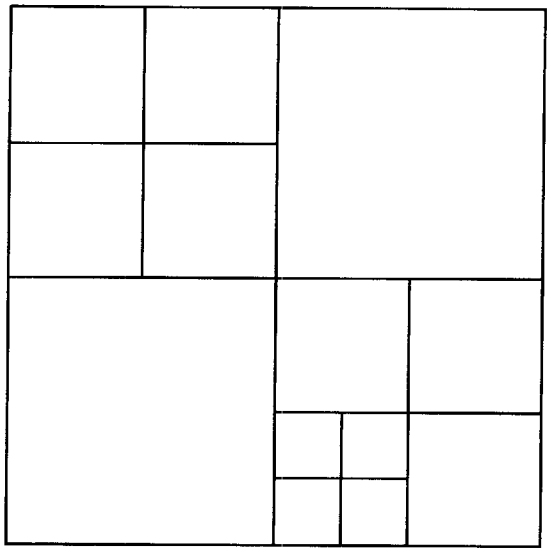
FIGS. 3a, 3b, and 3c illustrate an exemplary block size assignment, the corresponding quad-tree decomposition, and the corresponding PQR data.
Figure 3B:
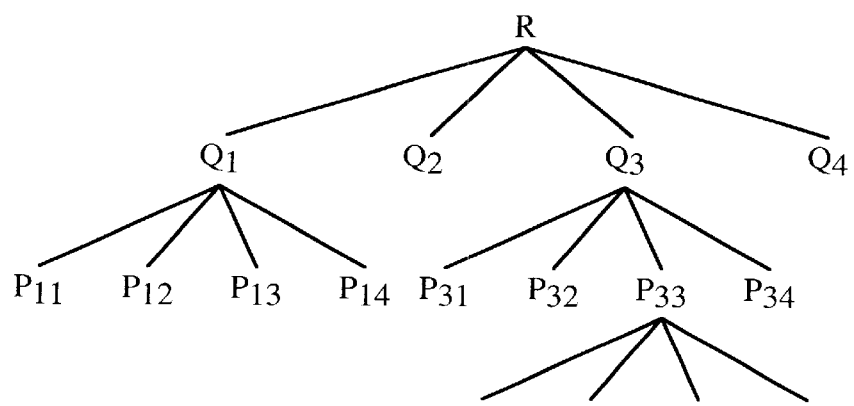
Figure 3C:
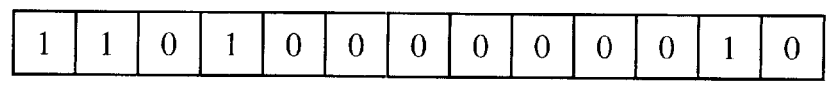

For purposes of illustration, consider the following example. Let the predetermined variance thresholds for the Y component be 50, 1100, and 880 for the 16×16, 8×8, and 4×4 blocks, respectively. In other words, T16=50, T8=1100, and T16=880. Let the range of mean values be 80 and 100. Suppose the computed variance for the 16×16 block is 60. Since 60 and its mean value 90 is greater than T16, the 16×16 block is subdivided into four 8×8 sub-blocks. Suppose the computed variances for the 8×8 blocks are 1180, 935, 980, and 1210. Since two of the 8×8 blocks have variances that exceed T8, these two blocks are further subdivided to produce a total of eight 4×4 sub-blocks. Finally, suppose the variances of the eight 4×4 blocks are 620, 630, 670, 610, 590, 525, 930, and 690, with corresponding means values 90, 120, 110, 115. Since the mean value of the first 4×4 block falls in the range (80, 100), its threshold will be lowered to T'4=200 which is less than 880. So, this 4×4 block will be subdivided as well as the seventh 4×4 block. The resulting block size assignment is shown in FIG. 3a. The corresponding quad-tree decomposition is shown in FIG. 3b. Additionally, the PQR data generated by this block size assignment is shown in FIG. 3c.

Note that a similar procedure is used to assign block sizes for the color components $C_1$ and $C_2$. The color components may be decimated horizontally, vertically, or both.

Additionally, note that although block size assignment has been described as a top down approach, in which the largest block (16×16 in the present example) is evaluated first, a bottom up approach may instead be used. The bottom up approach will evaluate the smallest blocks (2×2 in the present example) first.

Referring back to FIG. 1, the remainder of the image processing system 110 will be described. The PQR data, along with the addresses of the selected blocks, are provided to a DCT element 110. The DCT element 110 uses the PQR data to perform discrete cosine transforms of the appropriate sizes on the selected blocks. Only the selected blocks need to undergo DCT processing.

The image processing system 100 may optionally comprise DQT element 112 for reducing the redundancy among the DC coefficients of the DCTs. A DC coefficient is encountered at the top left corner of each DCT block. The DC coefficients are, in general, large compared to the AC coefficients. The discrepancy in sizes makes it difficult to design an efficient variable length coder. Accordingly, it is advantageous to reduce the redundancy among the DC coefficients.

The DQT element 112 performs 2-D DCTs on the DC coefficients, taken 2×2 at a time. Starting with 2×2 blocks within 4×4 blocks, a 2-D DCT is performed on the four DC coefficients. This 2×2 DCT is called the differential quadtree transform, or DQT, of the four DC coefficients. Next, the DC coefficient of the DQT along with the three neighboring DC coefficients with an 8×8 block are used to compute the next level DQT. Finally, the DC coefficients of the four 8×8 blocks within a 16×16 block are used to compute the DQT. Thus, in a 16×16 block, there is one true DC coefficient and the rest are AC coefficients corresponding to the DCT and DQT.

The transform coefficients (both DCT and DQT) are provided to a quantizer 114 for quantization. In a preferred embodiment, the DCT coefficients are quantized using frequency weighting masks (FWMs) and a quantization scale factor. A FWM is a table of frequency weights of the same dimensions as the block of input DCT coefficients. The frequency weights apply different weights to the different DCT coefficients. The weights are designed to emphasize the input samples having frequency content that the human visual system is more sensitive to, and to de-emphasize samples having frequency content that the visual system is less sensitive to. The weights may also be designed based on factors such as viewing distances, etc.

The weights are selected based on empirical data. A method for designing the weighting masks for 8×8 DCT coefficients is disclosed in ISO/IEC JTC1 CD 10918, "Digital compression and encoding of continuous-tone still images—part 1: Requirements and guidelines," International Standards Organization, 1994, which is herein incorporated by reference. In general, two FWMs are designed, one for the luminance component and one for the chrominance components. The FWM tables for block sizes 2×2, 4×4 are obtained by decimation and 16×16 by interpolation of that for the 8×8 block. The scale factor controls the quality and bit rate of the quantized coefficients.

Thus, each DCT coefficient is quantized according to the relationship:

$$DCT_q(i, j) = \left\lfloor \frac{8*DCT(i, j)}{fwm(i, j)*q} \pm \frac{1}{2} \right\rfloor$$

where DCT(i,j) is the input DCT coefficient, fwm(i,j) is the frequency weighting mask, q is the scale factor, and DCTq (i,j) is the quantized coefficient. Note that depending on the sign of the DCT coefficient, the first term inside the braces is rounded up or down. The DQT coefficients are also quantized using a suitable weighting mask. However, multiple tables or masks can be used, and applied to each of the Y, Cb, and Cr components.

The quantized coefficients are provided to a zigzag scan serializer 116. The serializer 116 scans the blocks of quantized coefficients in a zigzag fashion to produce a serialized stream of quantized coefficients. A number of different zigzag scanning patterns, as well as patterns other than zigzag may also be chosen. A preferred technique employs 8×8 block sizes for the zigzag scanning, although other sizes may be employed.

Note that the zigzag scan serializer 116 may be placed either before or after the quantizer 114. The net results are the same.

In any case, the stream of quantized coefficients is provided to a variable length coder 118. The variable length coder 118 may make use of run-length encoding of zeros followed by Huffman encoding. This technique is discussed in detail in aforementioned U.S. Pat. Nos. 5,021,891, 5,107, 345, and 5,452,104, and is summarized herein. A run-length coder would take the quantized coefficients and separate out the zero from the non-zero coefficients. The zero values are referred to as run-length values, and are Huffman encoded. The non-zero values are separately Huffman encoded.

A modified Huffman coding of the quantized coefficients is also possible and is used in the preferred embodiment. Here, after zigzag scanning, a run-length coder will determine the run-length/size pairs within each 8×8 block. These run-length/size pairs are then Huffman encoded.

Huffman codes are designed from either the measured or theoretical statistics of an image. It has been observed that most natural images are made up of blank or relatively slowly varying areas, and busy areas such as object boundaries and high-contrast texture. Huffman coders with frequency-domain transforms such as the DCT exploit these features by assigning more bits to the busy areas and fewer bits to the blank areas. In general, Huffman coders make use of look-up tables to code the run-length and the non-zero values. Multiple tables are generally used, with 3 tables being preferred in the present invention, although 1 or 2 can be employed, as desired.

The compressed image signal generated by the encoder 102 are transmitted to the decoder 106 via the transmission channel 104. The PQR data, which contains the block size assignment information, is also provided to the decoder 106. The decoder 106 comprises a variable length decoder 120, which decodes the run-length values and the non-zero values.

The output of the variable length decoder 120 is provided to an inverse zigzag scan serializer 122 that orders the coefficients according to the scan scheme employed. The inverse zigzag scan serializer 122 receives the PQR data to assist in proper ordering of the coefficients into a composite coefficient block.

The composite block is provided to an inverse quantizer 124, for undoing the processing due to the use of the frequency weighting masks.

The coefficient block is then provided to an IDQT element 126, followed by an IDCT element 128, if the Differential Quad-tree transform had been applied. Otherwise, the coefficient block is provided directly to the IDCT element 128. The IDQT element 126 and the EDCT element 128 inverse transform the coefficients to produce a block of pixel data. The pixel data may be then have to be interpolated, converted to RGB form, and then stored for future display.

Accordingly, a system and method is presented for image compression that performs block size assignment based on pixel variance. Variance based block size assignment offers several advantages. Because the Discrete Cosine Transform is performed after block sizes are determined, efficient computation is achieved. The computationally intensive transform need only be performed on the selected blocks. In addition, the block selection process is efficient, as the variance of pixel values is mathematically simple to calculate. Still another advantage of variance based block size assignment is that it is perceptually based. Pixel variance is a measure of the activity in a block, and provides indication of the presence of edges, textures, etc. It tends to capture the details of a block much better than measures such as the average of pixel values. Thus, the variance based scheme of the present invention assigns smaller blocks to regions with more edges and larger blocks to the flatter regions. As a result, outstanding quality may be achieved in the reconstructed images.

Yet another important advantage is that since the block size assignment is made prior to quantization, a greater flexibility is afforded in controlling the bit rate and quality. Since the variance threshold is adapted to the local mean, small blocks are assigned even in relatively dark areas. This preserves details in all areas that are above just noticeable visibility threshold. Furthermore, the variance based image compression provides a graceful degradation of image quality when the quantization scale factor is changed from low to high values unlike methods such as MPEG. This is particularly crucial for applications such as in the area of digital cinema.

With digital video in high demand, piracy is a serious threat. Digital watermarking is an important requirement to deter copyright infringement, and loss of revenue. As watermarking is done in areas of an image that are perceptibly significant, variance based block size assignment is a natural candidate for watermarking.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What we claim as our invention is:

1. A method for determining a block size assignment for an input block of image pixels to be used in compressing said input block, comprising the steps of:
    reading a block of pixel data;
    generating a block size assignment based on the variances of pixel values of said block of pixel data and subdivided blocks of said block of pixel data, said step of generating further comprising the steps of:
        determining a variance of pixel values for said block of pixel data;
        comparing said variance with a predetermined threshold, wherein said threshold is a function of the mean of pixel values of the block being evaluated;
        making a decision to subdivide said block if said variance is greater than said threshold;
        if said decision is to subdivide said block, then repeating the steps of determining, comparing, and making for each subdivided block until a predetermined criteria is satisfied;
        designating as said block size assignment each block that is not further subdivided; and
        providing a data structure containing information on said block size assignment.

2. The method of claim 1 wherein said threshold changes for each level of subdivision.

3. The method of claim 1 wherein said predetermined criteria for no longer repeating the steps of determining, comparing, and making is based on a pre-selected minimum block size of pixel data.

4. An image compression system for compressing a block of pixel data, comprising:
    block size assignment means for selecting said block or subdivided blocks of said block to be compressed based on the variances of pixel values of said block of pixel data and subdivided blocks of said block of pixel data, wherein said block size assignment means determines a variance of pixel values for said block of pixel data, compares said variance with a predetermined threshold, wherein said threshold is a function of the mean of pixel values of the block being evaluated, makes a decision to subdivide said block if said variance is greater than said predetermined threshold, if said decision is to subdivide said block, then repeats the determination of variance, the comparison with said predetermined threshold, and the decision to subdivide for each subdivided block until a predetermined criteria is satisfied, and designates as said block size assignment each block that is not further subdivided;
    transform means for transforming pixel data of said selected block or subdivided blocks into frequency domain data;
    quantizer means for quantizing said frequency domain data;
    serializer means for scanning said quantized data into a serialized stream of data; and
    variable length coding means for coding said serialized stream of data in preparation for transmission.

5. The system of claim 4 wherein said threshold changes for each level of subdivision.

6. The system of claim 4 wherein said predetermined criteria for no longer subdividing is based on a pre-selected minimum block size of pixel data being achieved.

7. The system of claim 4 wherein said transform means performs a Discrete Cosine Transform.

8. The system of claim 4 wherein said transform means performs a Discrete Cosine Transform followed by a Differential Quad-tree Transform.

9. The system of claim 4 wherein said serializer means comprises a zigzag scanner.

10. The system of claim 9 wherein said zigzag scanner employs an 8×8 block size for the zigzag scanning.

11. The system of claim 4 wherein said variable length coding means comprises a Huffman coder.

12. The system of claim 11 wherein said Huffman coder employs multiple look-up tables to code run-length and non-zero values.

13. The system of claim 12 wherein there are three look-up tables.

14. A method for compressing a block of pixel data of an image, comprising the steps of:

reading a block of pixel data;
generating a block size assignment based on the variances of pixel values of said block of pixel data and subdivided blocks of said block of pixel data, said step of generating further comprising the steps of:
  determining a variance of pixel values for said block of pixel data;
  comparing said variance with a predetermined threshold, wherein said threshold is a function of the mean of pixel values of the block being evaluated;
  making a decision to subdivide said block if said variance is greater than said threshold;
  if said decision is to subdivide said block, then repeating the steps of determining, comparing, and making for each subdivided block until a predetermined criteria is satisfied; and
  designating as said block size assignment each block that is not further subdivided;
providing a data structure containing information on said block size assignment;
transforming said the pixel data of selected blocks as indicated by said data structure into a frequency domain representation;
quantizing said frequency domain data based on human perceptual characteristics of the image;
scanning said quantized data into a serialized stream of data; and
coding said serialized stream of data in preparation for transmission.

15. The method of claim 14 wherein said threshold changes for each level of subdivision.

16. The method of claim 14 wherein said predetermined criteria for no longer repeating the steps of determining, comparing, and making is based on a pre-selected minimum block size of pixel data.

17. The method of claim 14, wherein Discrete Cosine Transform is performed during said step of transforming.

18. The method of claim 14, wherein a Discrete Cosine Transform is performed followed by a Differential Quad-tree Transform during said step of transforming.

19. The method of claim 14, wherein zigzag scanning is performed during said step of scanning.

20. The method of claim 19 wherein said zigzag scanning is performed using an 8×8 block size.

21. The method of claim 14, wherein Huffman coding is performed during said step of coding.

22. The method of claim 21 wherein said Huffman coding employs multiple look-up tables to code run-length and non-zero values.

23. The method of claim 22 wherein there are three look-up tables.

24. The method of claim 1, wherein said variance is determined by the following equation:

$$\text{var} = \frac{1}{N^2} \sum_{i=0}^{N-1} \sum_{j=0}^{N-1} x_{i,j}^2 - \left( \frac{1}{N^2} \sum_{i=0}^{N-1} \sum_{j=0}^{N-1} x_{i,j} \right)^2$$

where N=dimension of the block, and $x_{i,j}$ is the pixel in the $i^{th}$ row, $j^{th}$ column within the N×N block.

25. The system of claim 4, wherein said variance is determined by the following equation:

$$\text{var} = \frac{1}{N^2} \sum_{i=0}^{N-1} \sum_{j=0}^{N-1} x_{i,j}^2 - \left( \frac{1}{N^2} \sum_{i=0}^{N-1} \sum_{j=0}^{N-1} x_{i,j} \right)^2$$

where N=dimension of the block, and $x_{i,j}$ is the pixel in the $i^{th}$ row, $j^{th}$ column within the N×N block.

26. The method of claim 14, wherein said variance is determined by the following equation:

$$\text{var} = \frac{1}{N^2} \sum_{i=0}^{N-1} \sum_{j=0}^{N-1} x_{i,j}^2 - \left( \frac{1}{N^2} \sum_{i=0}^{N-1} \sum_{j=0}^{N-1} x_{i,j} \right)^2$$

where N=dimension of the block, and $x_{i,j}$ is the pixel in the $i^{th}$ row, $j^{th}$ column within the N×N block.

27. A system for compressing a block of pixel data of an image, the system comprising:
  reading means for reading a block of pixel data;
  generating means for generating a block size assignment based on the variances of pixel values of said block of pixel data and subdivided blocks of said block of pixel data, said generating means further comprising:
    determining means for determining a variance of pixel values for said blocks of pixel data;
    comparing means for comparing said variances with a predetermined threshold, wherein said threshold is a function of the mean of pixel values of the block being evaluated;
    decision making means to make a decision to subdivide said block if said variance is greater than said threshold;
    if said decision making means is to subdivide said block, then determining, comparing, and making for each subdivided block until a predetermined criteria is satisfied; and
    designating means for designating as said block size assignment each block that is not further subdivided.

28. The system of claim 27, wherein said threshold changes for each level of subdivision.

29. The system of claim 27, wherein said predetermined criteria is based on a preselected minimum block size of pixel data.

30. The system of claim 27, wherein said transforming means utilizes the Discrete Cosine Transform.

31. The system of claim 27, wherein said transform means utilizes a Discrete Cosine Transform followed by a Differential Quad-tree Transform.

32. The system of claim 27, wherein said scanning means utilizes zig-zag scanning.

33. The system of claim 27, wherein said coding means utilizes Huffman coding.

34. The system of claim 33, wherein said Huffman coding utilizes multiple look-up tables to code run-length and non-zero values.

35. A computer readable medium containing instructions for controlling a computer system to perform a method, the method comprising:
  reading a block of pixel data;
  generating a block size assignment based on the variances of pixel values of said block of pixel data and subdivided blocks of said block of pixel data, said step of generating further comprising the steps of:
    determining a variance of pixel values for said block of pixel data;

comparing said variance with a predetermined threshold, wherein said threshold is a function of the mean of pixel values of the block being evaluated;

making a decision to subdivide said block, then repeating the steps of determining, comparing, and making for each subdivided block until a predetermined criteria is satisfied;

designating as said block size assignment each block that is not further subdivided; and providing a data structure containing information on said block size assignment.

* * * * *

UNITED STATES PATENT AND TRADEMARK OFFICE
CERTIFICATE OF CORRECTION

PATENT NO. : 6,529,634 B1 Page 1 of 1
APPLICATION NO. : 09/436085
DATED : March 4, 2003
INVENTOR(S) : Kadayam Thyagarajan and Michael J. Merritt It is certified that error appears in the above-identified patent and that said Letters Patent is hereby corrected as shown below:

Col. 12, delete claims 30-34.

Signed and Sealed this

Eighth Day of May, 2007

JON W. DUDAS
*Director of the United States Patent and Trademark Office*